United States Patent [19]

Schell

[11] Patent Number: 5,832,948

[45] Date of Patent: Nov. 10, 1998

[54] LIQUID TRANSFER SYSTEM

[75] Inventor: Daniel Schell, San Jose, Calif.

[73] Assignee: Chemand Corp., San Jose, Calif.

[21] Appl. No.: 777,681

[22] Filed: Dec. 20, 1996

[51] Int. Cl.[6] ................................................ G05D 7/06
[52] U.S. Cl. .......................... 137/93; 137/126; 137/142; 137/145; 137/208; 137/256; 137/263
[58] Field of Search ................................ 137/5, 93, 126, 137/142, 145, 208, 256, 263

[56] References Cited

U.S. PATENT DOCUMENTS

| | | | |
|---|---|---|---|
| 56,597 | 7/1866 | Naglee | 137/150 |
| 831,059 | 9/1906 | Greth | 137/124 |
| 5,148,945 | 9/1992 | Geatz | 137/208 X |
| 5,330,072 | 7/1994 | Ferri et al. | 137/208 X |
| 5,522,660 | 6/1996 | O'Dougherty et al. | 137/93 X |

*Primary Examiner*—Gerald A. Michalsky
*Attorney, Agent, or Firm*—Robert O. Guillot

[57] ABSTRACT

The liquid transfer system includes a liquid supply tank and at least two pressurizable liquid holding vessels. The liquid holding vessels are placed beneath the supply tank, and a liquid supply line connects the supply tank to each vessel. The liquid supply line is operated as a siphon from the tank to each vessel, in order to move liquid from the tank to each vessel. Each vessel is alternately filled and pressurized to dispense liquid from the vessel, such that one vessel is being filled while the other is dispensing liquid, and a constant controllable liquid output flow is achieved. A preferred embodiment includes a liquid recycling line to recycle or constantly move the liquid within the system to achieve thorough mixing, and an in-line filter to improve liquid purity.

32 Claims, 2 Drawing Sheets

LIQUID TRANSFER SYSTEM

BACKGROUND OF THE INVENTION

1. Field of the Invention

The present invention relates generally to systems for transferring liquid from a storage tank to an output line, and more particularly to liquid transfer systems utilized in the semiconductor industry wherein high purity and accurate liquid flow rate controls are necessary.

2. Description of the Prior Art

Many semiconductor manufacturing steps require the utilization of high purity liquids, such as acids and solvents, and various liquid transfer systems are utilized to deliver such liquids. Because the manufacturing steps must be precisely controlled, similar precise controls are required in the delivery of the liquids, such as precise liquid flow rates with minimal variance in the flow rates. Therefore, liquid delivery systems which rely upon pumps to move the liquid are less desirable than systems which move liquid without utilizing pumps.

Prior art liquid delivery systems that do not use pumps, generally utilize controlled gas pressure within a pressurizable liquid holding vessel to push liquid from the vessel in a controllable manner. Systems utilizing two pressurizable liquid holding vessels to alternatively deliver liquid are known in the prior art, wherein one vessel is filled while the second vessel is pressurized to dispense liquid therefrom. By alternately filling and dispensing liquid from two pressurizable vessels, a constant, controllable flow of liquid is obtained. However, the inputting of liquid into the vessels during the fill cycle can be problematical. The prior art utilizes a constant vacuum, pumping, or significant pressure to move liquid from a supply tank to each vessel during the fill cycle. The constant vacuum or pressure can alter the delicate chemistry of some types of liquids, such as by removing volatile organic compounds from solvents or adding small bubbles into the liquids, where such bubbles are detected and identified as particulate impurities in the liquid. Pumping such high purity chemistries can contaminate with both particles and trace metal ionics.

The present invention provides an improvement on such liquid transfer systems by placing the pressurizable vessels beneath the supply tank, such that a siphon effect can be utilized to transfer liquid from the supply tank to the vessels. Once a siphon effect has been established, there is no further need for pressure or continued vacuum effect to move the liquid from the supply tank to the vessels, thus improving the quality of the output liquid from the system.

SUMMARY OF THE INVENTION

It is an advantage of the present invention that neither significant pressure nor significant vacuum is necessary to transfer liquid from a supply tank to a liquid holding vessel.

It is another advantage of the present invention that it utilizes a siphon effect to transfer liquid from a supply tank to a liquid holding vessel.

It is a further advantage of the present invention that high purity liquids are dispensed for semiconductor manufacturing process steps.

It is yet another advantage of the present invention that the occurrence of small bubbles in dispensed liquids is reduced.

It is yet a further advantage of the present invention that an automated liquid transfer system is provided which delivers high purity liquids at controlled flow rates.

The liquid transfer system of the present invention includes a liquid supply tank and at least two pressurizable liquid holding vessels. The liquid holding vessels are placed beneath the supply tank, and a liquid supply line connects the supply tank to each vessel. The liquid supply line is operated as a siphon from the tank to each vessel, in order to move liquid from the tank to each vessel. Each vessel is alternately filled and pressurized to dispense liquid from the vessel, such that one vessel is being filled while the other is dispensing liquid, and a constant controllable liquid output flow is achieved. A preferred embodiment includes a liquid recycling line to recycle or constantly move the liquid within the system to achieve thorough mixing, and an in-line filter to improve liquid purity.

These and other features and advantages of the present invention will become apparent to those skilled in the art upon review of the following detailed description.

IN THE DRAWING

DETAILED DESCRIPTION OF THE PREFERRED EMBODIMENTS

Figure 1:
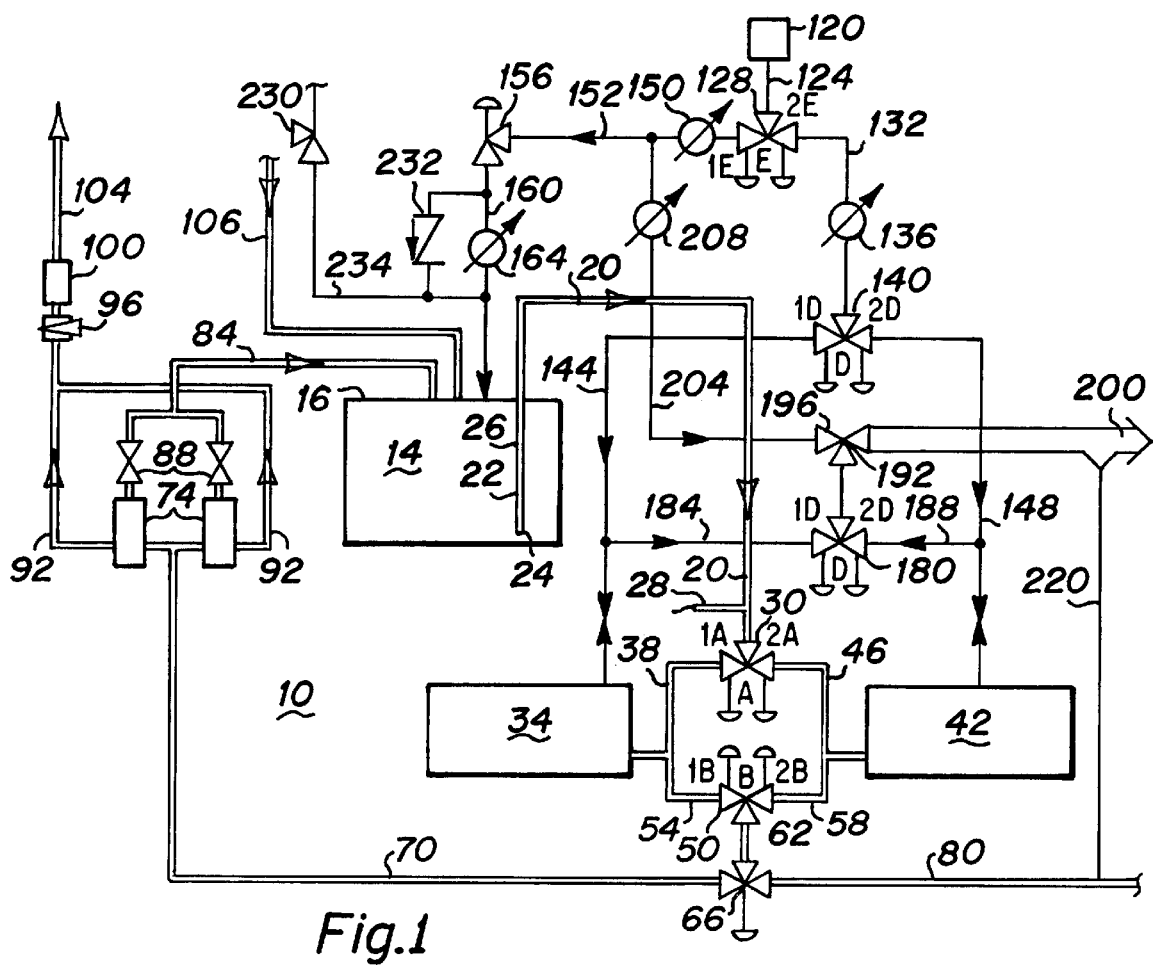
FIG. 1 is a schematic diagram depicting the basic liquid transfer system of the present invention.

FIG. 1 is a detailed depiction of a preferred liquid transfer system 10 of the present invention, wherein gas pipes are shown as a single line and liquid pipes are shown as a double line. As depicted in FIG. 1, a liquid supply tank 14 is disposed in a vertically elevated position relative to two pressurizable liquid holding vessels 34 and 42. In the preferred embodiment, the tank 14 is a 55 gallon drum, as is commonly found in the chemical industry; however, other types of tanks, such as canisters and totes of any size are contemplated in this invention. A lid 16 is disposed upon the tank 14. In some system installations the lid 16 may be open to atmospheric pressure, while in other system installations the lid 16 is engaged to the tank with a pressurizable seal, such that the stability of the chemistry of the liquid in the tank 14 is maximized and the tank 14 is pressurizable, as will be discussed hereinafter. A liquid supply line 20 is engaged to the tank 14 through the lid 16, such that an internal tank line portion 22 of the liquid supply line 20 projects downwardly to a line end 24 disposed at the bottom of the tank 14. The liquid supply line 20 delivers liquid to the two vessels 34 and 42, which are disposed beneath the tank 14, such that the internal tank line 22 with end 24 comprises a siphon line 26, and a siphon effect is utilized to transfer liquid from tank 14 to the vessels 34 and 42.

The utilization of the siphon line 26 is significant in that it permits the simple placement and installation of 55 gallon drums in a vertical orientation and allows for the efficient removal of liquid therefrom. Because many chemical processes have stringent chemical purity requirements, it is advantageous to be able to remove liquid from the tank 14 without the use of significant vacuum means. Specifically, it is known that the use of significant vacuum to transfer liquids can alter the normality of the chemistry, resulting in degraded performance of the chemistry. The use of a siphon line 26 through supply line 20 thus takes advantage of gravitational forces and produces improved chemical properties in the liquid transfer system 10. A detailed description of further features of the liquid transfer system 10 is next provided.

The liquid supply line 20 is connected from the liquid supply tank 14 to a 3-way valve 30 (also identified with the letter A) which is described hereinafter in detail with the aid of FIG. 2. A line sensor 28 in line 20 is used to indicate the presence or absence of liquid in line 20. The valve 30 may be activated to supply liquid to a first pressurizable liquid holding vessel 34 through line 38 or to a second pressurizable liquid holding vessel 42 through line 46. Liquid from vessel 34 is deliverable to a 3-way valve 50 (also identified with the letter B and depicted in FIG. 3 herebelow) through line 54, whereas liquid from tank 42 is deliverable to the 3-way valve 50 through line 58. Liquid from the valve 50 is delivered to liquid flow line 62 to a 2-way valve 66 (also identified with the letter F and depicted in FIG. 4). Liquid normally flows through the valve 66 to the liquid feed line 70 and then to filters 74, but if valve 66 is activated the liquid flows to a drain line 80. In this preferred embodiment, two filters 74 are placed in parallel in line 70 to remove unwanted impurities from the liquid. A liquid return line 84 that is accessible utilizing valves 88, can be utilized to recirculate liquid from the filters back to the supply tank 14. Normally, liquid passing through filters 74 is piped through parallel lines 92 to the liquid outlet flow control valve 96 and sensor 100, to the output line 104. In some system installations a liquid inlet return line 106 may be utilized to return liquid to tank 14 that has been output through line 104 to a user process.

The flow of liquid from the vessels 34 and 42 is controlled by gas pressure, preferably utilizing a relatively inert gas such as nitrogen, although air or other gasses may be used in various applications. As depicted in FIG. 1, nitrogen from a source 120 is fed through delivery line 124 to a 3-way valve 128 (also identified with the letter E). In a first gating from valve 128, pressurized gas is fed through a line 132 that is controlled by a gas regulator 136 to a 3-way valve 140 (also identified with the letter D). Pressurized gas can then be gated from valve 140 to vessel 34 through gas line 144 or to vessel 42 through gas line 148.

Returning to valve 128, the left hand gating from valve 128 delivers pressurized gas through a gas regulator 150 and line 152 to a gas control valve 156 (also identified with the letter G). Activation of valve 156 causes pressurized gas to pass through line 160, through regulator 164 to the supply tank 14. The regulator 164 permits gas to enter the tank 14 to provide volumetric gas replacement for liquid removed from tank 14 or to enhance/assist the siphon effect.

In order to fill tanks 34 or 42 with liquid, it is necessary to outlet any gas present in vessels 34 and 42 that is displaced by inletted liquid. To accomplish the outletting of gas from vessels 34 and 42, a 3-way valve 180 is engaged by gas lines 184 and 188 to lines 144 and 148 respectively. The 3-way valve 180 is preferably connected to the suction orifice 192 of a venturi valve 196 which is connected to a gas exhaust 200. Pressurized gas to operate the venturi valve 196 is delivered through gas line 204 which is connected through a gas regulator 208 to pressurized gas line 152 that is connected to valve 128. Therefore, when valve 180 is opened it permits the outletting of gas from vessels 34 or 42 during the liquid filling of those tanks. Additionally, if the venturi valve 196 is activated, a suction force can be applied through valve 180 to facilitate the removal of displaced gas from vessels 34 and 42. A drain line gas exhaust line 220 is connected between the drain line 80 and the exhaust 200.

It is therefore to be generally understood that when liquid is present in supply tank 14 and valve 30 is opened to either vessel 34 or 42 that a siphon effect (assuming that liquid is present in line 20) will cause the liquid to flow from supply tank 14 into a vessel 34 or 42, with replacement gas flowing into tank 14 through valves 128 and 156.

The primary means for initiating a siphon from tank 14 is through a vacuum from the siphon line 26. To initiate the vacuum, gas valve 128 is opened and valve 156 is closed to cause pressurized gas to flow through line 204 to the venturi 196. This causes a vacuum to be created from the suction orifice 192 of the venturi valve 196 back to the valve 180. Valve 180 may be opened to either vessel 34 or 42 through line 184 or 188, and when valve 30 is opened to the appropriate line 28 or 46 from tanks 34 or 42 respectively, the vacuum will be created in line 20 back to tank 14. Once a siphon flow is initiated the vacuum effect is discontinued as the gravity induced flow of the siphon will continue to cause fluid movement from tank 14 when required in the system. It is important with volatile liquids to remove the vacuum pressure that initiates the siphon as soon as is possible to preserve VOCs in the liquid and not affect the chemistry of the liquid. Additionally excess vacuum exposure can add bubbles into the liquid, resulting in difficulty in qualifying the chemistry for ultra high purity applications.

Additionally, as a second means for initiating a siphon through pipe 20, if valves 128 and 156 are appropriately activated, pressurized gas will be inlet into supply tank 14 to aid in the flow of liquid from supply tank 14 through line 20 to vessels 34 or 42, thus filling vessels 34 or 42 with liquid. Such a pressure assist to the siphon is utilizable both to initiate the siphon and when a viscous liquid is being processed in the system 10.

An alternating fill-empty process is preferably utilized to transfer liquid from the vessels 34 and 42 through valve 50 to line 70. To transfer liquid from vessel 34, valves 128 and 140 are appropriately opened to cause pressurized gas to flow through line 144 into vessel 34, and valve 50 is opened to permit liquid to flow from vessel 34. When vessel 34 is nearly empty, valve 140 is activated to cause pressurized gas to flow through line 148, into vessel 42. Simultaneously, valve 50 is operated to permit liquid to flow from vessel 42 into line 70. While liquid from vessel 42 is being emptied through line 70, liquid from supply tank 14 is simultaneously caused to fill vessel 34, as has been discussed hereabove. When vessel 42 is nearly empty, valve 140 is activated to cause pressurized gas to flow through line 144, to cause liquid to flow from vessel 34, with valve 50 having been appropriately activated to allow liquid to flow from vessel 34. While liquid flows from vessel 34, vessel 42 is filled. It is therefore to be understood that liquid can be constantly transferred through line 70 by alternately filling and emptying vessels 34 and 42. Through appropriate control of the various valves of system 10, the liquid flow rate through line 70 can be constantly maintained. It is to be further appreciated that the liquid delivery system 10 does not use reciprocating pumps or other devices that cause a pulsating pressurized liquid flow. Rather, the liquid delivery system 10 provides a constant pressure liquid flow that is very controllable at low flow rates through control valve 96. For gas control and safety reasons gas release check valves 230 and 232 are engaged through gas line 234 to the gas delivery line 160 for tank 14.

To provide a fuller understanding of the operation of the liquid delivery system 10, a valve table is presented in Table 1 herebelow wherein "O" means open and "C" means closed and wherein "A" refers to valve 30, "B" refers to valve 50, "C" refers to valve 180, "D" refers to valve 140, "E" refers to valve 128, "F" refers to valve 66, and "G" refers to valve 150. The comprehension of the valve settings as set forth in Table 1 will be well understood by those skilled in the art in contemplation of FIG. 1, and a detailed description thereof is therefore unnecessary.

for the input and output of liquids and gasses, as well as the interconnection of external components. The tank 14 may be a 55 gallon drum (or a canister or a tote, etc.) having a lid 16, which may be open to the ambient atmosphere in situations where purity and chemistry requirements allow, or may be an air sealed lid where system requirements dictate.

TABLE 1

|  | 1A | 1B | 1C | 1D | 2A | 2B | 2C | 2D | 2E | 1G | 1F | No Drum Pressure 1E | Drum Press. 1E |
|---|---|---|---|---|---|---|---|---|---|---|---|---|---|
| To Fill PV1 | o | c | o | c | c | c | c | c | o | c | c | c | o |
| Fill PV1 | o | c | o | c | c | c | c | c | c | c | c | c | o |
| Press PV1 | c | o | c | o | c | c | c | c | o | c | c | c | c |
| To Fill PV2 | c | c | c | c | o | c | o | c | o | c | c | c | o |
| Fill PV2 | c | c | c | c | o | c | o | c | c | c | c | c | o |
| Press PV2 | c | c | c | c | c | o | c | o | o | c | c | c | c |
| To Rest | c | c | c | c | c | c | o | o | c | o | c | o | c |
| At Rest | c | c | c | c | c | c | c | c | c | o | c | o | c |

☐ DEPENDS ON OTHER PRESSURE VESSEL STATUS
c  Closed
o  Open

Figure 2:
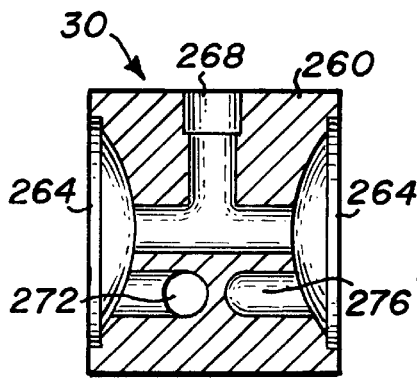
FIG. 2 is a cross-sectional depiction of a 3-way valve utilized in the present invention.
Figure 3:
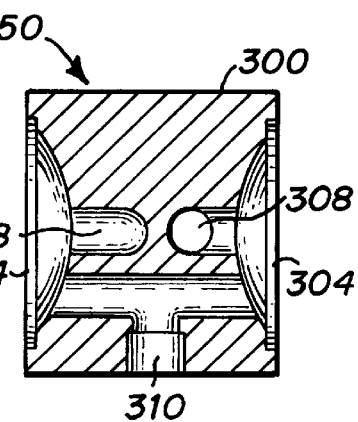
FIG. 3 is a cross-sectional view of a 3-way valve utilized in the present invention.

A cross-sectional view of the 3-way valve preferably utilized as valve 30 is depicted in FIG. 2. This valve is commercially available from the Marcvalve Corporation, Tewksbury, Mass., identified by valve model no. 1003WDT-SANPC. The significant features of the valve are the PTFE valve body 260 with pneumatic actuators and PTFE Teflon diaphragms 264. The valve 30 is oriented with an upper inlet orifice 268 and lower outlet orifices 272 and 276. A significant feature of the valve 30 is that no liquid gathers within the diaphragm chamber due to the lower placement of the outlet orifices 272 and 276.

Figure 4:
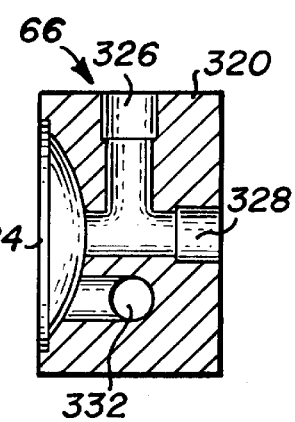
FIG. 4 is a cross-sectional view of a 2-way valve utilized in the present invention.

FIG. 4 is a cross-sectional view of a preferred 3-way valve 50. Such a valve is commercially available from the Marcvalve Corporation, valve model no. 1003WMSBANPC having a PTFE valve body 300 with pneumatic actuators and PTFE Teflon diaphragms 304. The inlet orifices 308 are disposed in the middle of the valve body 300, whereas the outlet orifice 310 is disposed at the bottom of the valve body 300, when the valve is properly installed. In this orientation, the valve 50 is self draining, such that minimal liquid resides within the valve body 300.

Figure 5:
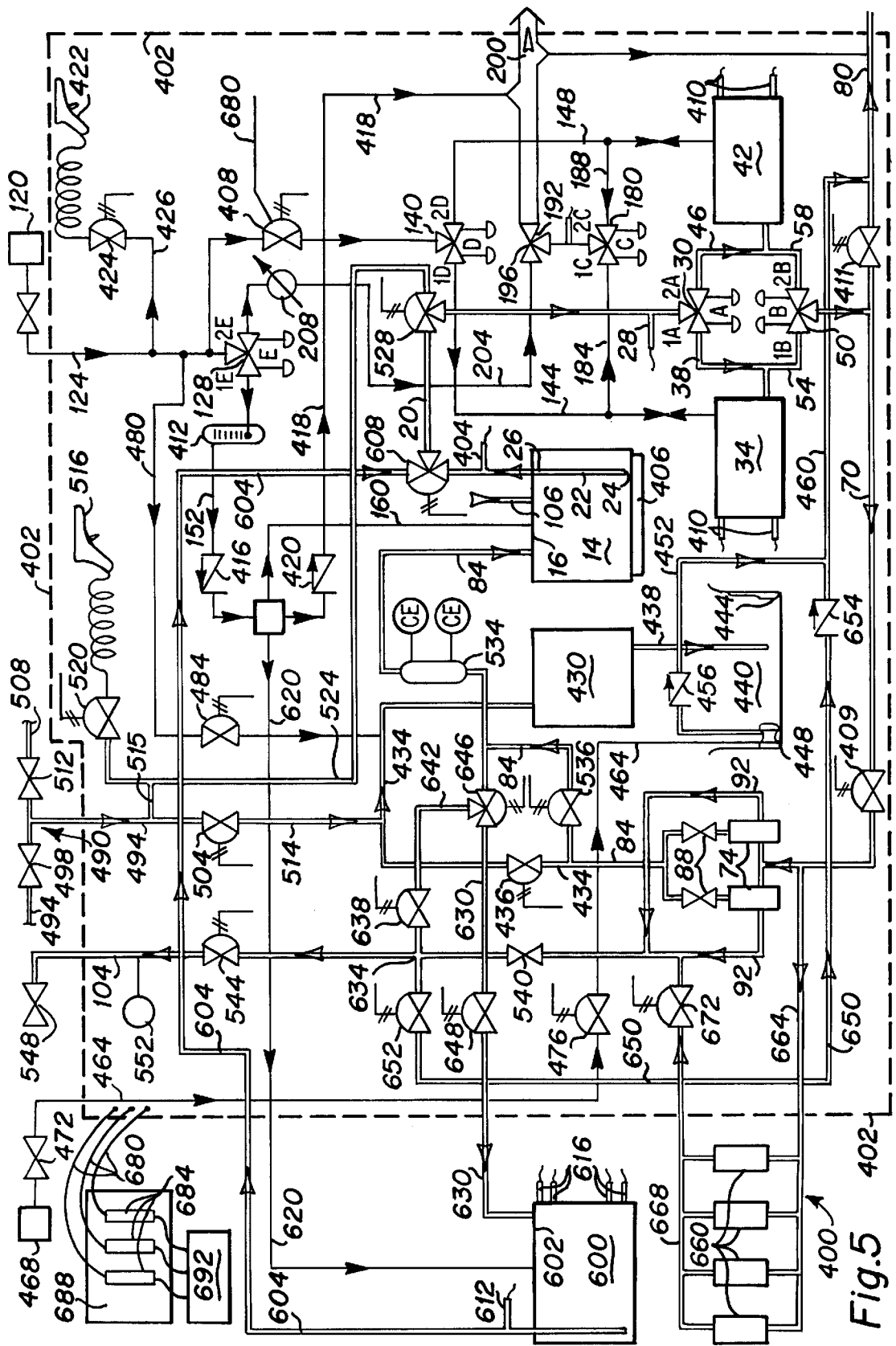
FIG. 5 depicts an expanded liquid transfer system of the present invention.

A cross-sectional view of the preferred 2-way valve 66 is depicted in FIG. 5. Such a valve 66 is commercially available from the Marcvalve Corporation, valve model no. 1002WTLFANPC, having a PTFE valve body 320, pneumatic actuators and a PTFE Teflon diaphragm 324. In proper orientation, the valve inlet 326 faces upwardly, the normal valve outlet 328 is midway disposed and the valve drain outlet 332 is downwardly disposed at the lower portion of the diaphragm 324. When the valve 66 is activated, liquid will drain through outlet 332, such that no liquid will reside within the chamber of diaphragm 324.

FIG. 5 depicts an expanded liquid transfer system 400, generally including the liquid transfer system depicted and described hereabove with regard to FIG. 1; similar structural features are numbered similarly to those of FIG. 1. System 400 is generally designed such that its major components are generally contained in and/or engaged to a single cabinet structure 402, having a plurality of external interconnections Alternatively, in a preferred embodiment the tank 14 is disposed within the cabinet structure 402, and the cabinet structure 402 is sealable and pressurizable while the lid 16 is not engaged to the tank 14 with a pressurizable seal. In this configuration the pressurization of the cabinet structure 402 may be used to create pressure upon the liquid in tank 14; such a configuration is particularly advantageous when tank 14 is a 55 gallon drum which cannot effectively be pressurized without some danger of rupture.

The liquid transfer system 400 includes the liquid supply tank 14, a siphon line 26 which delivers liquid through line 20 to two pressurizable liquid holding vessels 34 and 42. As with the system 10 of FIG. 1, the vessels 34 and 42 are disposed beneath the tank 14, such that gravitational force and the siphon line 26 are primarily utilized to transfer liquid from the tank 14 to the vessels 34 and 42. Nitrogen gas from a source 120 is fed through valve 140 to alternately pressurize tanks 34 and 42 to transfer liquid from tanks 34 and 42, as has been discussed hereabove with regard to system 10. As with system 10, the siphon effect is preferably started utilizing a vacuum initiated by venturi 196 through vessels 34 and 42 to tank 14.

A first difference between system 400 and system 10 is that the nitrogen gas line to valve 140 does not pass through valve 128, as taught in system 10. Rather, in system 400, nitrogen gas from the source 120 passes through an air operated proportional valve 408. Valve 408 permits operator control of the gas pressure into tanks 34 and 42 and thus provides control of the liquid flow rate from vessels 34 and 42. Liquid from vessels 34 and 42 passes through valve 50 to line 70 that is controlled by an air operated valve 409. Alternatively, liquid from valve 50 can be directed to drain 80 through air operated valve 411. Each of vessels 34 and 42 is supplied with liquid level detectors 410 which provide control information regarding the full or empty status of vessels 34 and 42. Additionally, a sensor 404 is utilized to detect liquid flow from the tank 14. In the preferred embodiment, a capacitive sensor which senses air in the line is utilized to indicate when the tank is empty. An alternative method of determining the quantity of liquid in tank 14 is to place tank 14 upon a scale 406, the output of which will indicate the fill status of tank 14.

A gas flow meter 412 is disposed in the gas line 152 from valve 128 to tank 14, to control the gas pressure that is input into pressurizable tank 14. The preferred meter 412 has a range from 0–0.5CFH. A one way check valve 416 is provided in gas line 152 to further control gas flow throughout the system 400, and a gas line 160 inputs gas from the check valve 416 into tank 14. To provide gas pressure control, a gas exhaust line 418 that is controlled by one way check valve 420 is engaged to the gas supply line 160. The gas exhaust line 416 feeds to the system exhaust 200 in the event that gas pressure greater than that allowed by check valve 420 is experienced in the system gas lines. Additionally, the preferred embodiment includes a nitrogen gas spray nozzle 422 that is controlled by air operated valve 424 engaged in line 426 from gas supply line 124.

System 400 includes a sample port 430 and a sump 440 as additional features, not included in the basic system 10 of FIG. 1. Sample port 430 is utilized to provide the operator with selectable samples of the liquid that is flowing through the system 400. To achieve this, a sample line 434 is engaged to an output line 84 from the filters 74. An air operated valve 436 is utilized to control the flow of liquid through the sample line 434 to the sample port 430. A sample port drain line 438 is utilized to drain liquid from the sample port 430 to the sump 440. The sump 440 includes a liquid detector 444 and a sump pump 448 which is utilized to pump any liquid resident in sump 440 out through sump line 452, and through a check valve 456 disposed therein, to a drain line 460 that is connected to the drain line 80. In the preferred embodiment, the sump pump 448 is air operated through air line 464 from a source 468 of clean dry air (CDA) that is controlled by a manual valve 472 and an air operated valve 476. To facilitate cleaning of the sample port 430, a nitrogen supply line 480, that is operable through air controlled valve 484, is engaged to the sample port supply line 434, such that nitrogen gas may be directed to the sample port to clean out and dry out the sample port 430.

A deionized water supply system 490 is included in the system 400. The deionized water supply system 490 includes a deionized water supply line 494, operatable through a manual valve 498 and a gas operated valve 504, as well as a deionized water return line 508 that is operable through manual valve 512. The return line is utilized to maintain constant motion of the deionized water through the supply and return lines when it is not flowing through the system, in order to prevent stagnation of the deionized water and the water purity problems that can result from stagnation. As can be seen in FIG. 5, through the operation of air valve 504, deionized water can be fed through line 514 to the sample port 430 in order to clean out the sample port 430. A deionized water spray nozzle 516 may be engaged to supply line 494 through line 518 and controlled by air operated valve 520.

Deionized water may also be fed through line 524 to an air operated valve 528 that is disposed in liquid transfer line 20. Thus, deionized water may be input into line 20 through line 524 utilizing valve 528, in order to clean out vessels 34 and 42, as well as valves 30 and 50 and generally all of the liquid supply system lines. Additionally, through valve 528 deionized water can be controllably added to liquid within the system 400, including liquid within tank 14, to controllably adjust the concentration of liquids flowing through the system. To provide liquid concentration control information, a testing device, such as a conductivity electrode 534 is installed in the liquid transfer line system, such as in the liquid return line 84 from the filters 74 to the tank 14. Thus, utilizing the liquid transfer system 400, deionized water may be controllably blended with the liquid in tank 14 through recirculation line 84, until the detector 534 indicates that a predetermined concentration has been reached, whereupon the blended liquid can then be output through line 104.

Liquid output through output line 104 is controlled by a manual valve 540, an air operated valve 544 and a manual valve 548. Additionally, a pressure transducer 552 is connected to output line 104 to provide control information regarding liquid output pressure and flow rate. This control information is utilizable to provide control signals to the proportional valve 408, to control the gas pressure input to vessels 34 and 42, and thereby control output liquid flow rates.

In various industrial applications, it will be beneficial to engage an outside tank 600, which may constitute one or more 55 gallon drums, a day tank (holding an approximate quantity of liquid that would be utilized in a day's operation of the system), or other liquid holding tanks in association with tank 14. The operative installation of a tank 600 includes a pressure seal lid 602 and a liquid supply line 604 from tank 600 to an air operated valve 608 engaged in line 20. Liquid from tank 600 can therefore be input directly through valve 608 into line 20 for further input to vessels 34 and 42. The end 610 of line 604 is preferably located at the bottom of tank 600, in a manner similar to end 24 of line 20 of tank 14. As with tank 14, a line sensor 612 is utilized on the output line 604 from tank 600 to sense the fill status of liquid from tank 600, and liquid level sensors 616 are utilized to provide high and low liquid levels in a tank 600. In the preferred embodiment, tank 600 is located above vessels 34 and 42, such that a siphon effect through line 604 can be accomplished. Thus, the beneficial use of the siphon effect, as described hereinabove with regard to tank 14, is likewise achievable from the tank 600. A gas line 620 is engaged to line 152 to provide pressurized gas to tank 600 through its pressure seal lid 602. The gas through line 620 is utilizable to force liquid through line 604 to initiate the siphon effect, and to provide volumetric replacement gas when liquid is siphoned from tank 600.

A liquid return line 630 is provided to return liquid to tank 600. The liquid return line 630 is operable through a junction 634 in line 104, through air operated valve 638 in line 642 to air operated valve 646, which gates liquid either to the tank 14 return line 84, or to the tank 600 return line 630 which is controlled by air operated valve 648. A system drain line 650 is connected to the junction 634 and controlled by air operated valve 652 and check valve 654 to deliver liquid to drain line 80.

It is anticipated in various industrial installations that external filters 660 will be utilized in addition to the filters 74. To accomplish this, a filter feed line 664 is engaged to the liquid transfer line 70, to a plurality of external filters 660 disposed in parallel, and thence to a return line 668 which is controlled by air operated valve 672 to the liquid output line 104. It can therefore be appreciated that the filters 660 are installed in parallel with filters 74.

The liquid transfer system 400 described and depicted hereabove is an automated system which utilizes a plurality of air controlled valves (such as valve 424) to accomplish liquid transfer operations. In the preferred embodiment, each of the air controlled valves is engaged through an air tube 680 to an electronically controlled solenoid air valve 684 that is generally disposed on a control panel 688. Each of the solenoid air valves 684 is electrically controlled by a computerized controller 692. Electrical signals from the various sensors of system 400, together with operator instructions to the controller 692 are utilized to operate the system 400.

While the invention has been shown and described with regard to certain preferred embodiments, it will be well understood by those skilled in the art that have read the preceding specification, that certain alterations and modifications to the system may be made without departing from the true spirit and scope of the invention. Therefore, the following claims are to be interpreted as covering all such alterations and modifications as would fall within the true spirit and scope of the invention.

What I claim is:

1. A liquid transfer system comprising:
    a liquid supply tank;
    at least two pressurizable liquid holding vessels;
    a liquid supply line being connected between said tank and each said vessel for supplying liquid from said tank to each said vessel; said liquid supply line being engaged to said tank to act as a liquid siphon in withdrawing said liquid from said tank and supplying said liquid to said vessel;
    a siphoned liquid sensor means being operatively engaged within said liquid supply system to provide an indication that siphoned liquid is passing from said liquid supply tank to said liquid holding vessels; and
    a liquid output line being operatively engaged to said liquid holding vessels for the transfer of liquid therefrom.

2. A liquid transfer system as described in claim 1 wherein said vessels are disposed beneath said tank, such that a liquid level within said vessels is at all times lower than a liquid level within said tank; and
    wherein said siphoned liquid sensor means is operatively engaged within said liquid supply system to detect the presence of siphoned liquid within said liquid supply line.

3. A liquid transfer system as described in claim 1 wherein a vacuum from at least one of said vessels is utilized to initiate said siphon.

4. A liquid transfer system as described in claim 3 wherein a gas line is engaged to said vessel to create said vacuum in said vessel.

5. A liquid transfer system as described in claim 3 wherein said vacuum is applied to said liquid supply line.

6. A liquid transfer system as described in claim 1 wherein said tank is pressurizable and a gas supply line is engaged to said tank to supply pressurized gas to said tank to initiate said siphon.

7. A liquid transfer system as described in claim 1 wherein a gas supply line is engaged with said tank to supply volumetric replacement gas for liquid withdrawn from said tank.

8. A liquid transfer system as described in claim 1 wherein a vessel gas line is engaged to each said vessel to remove gas from said vessel as liquid is inlet into said vessel.

9. A liquid transfer system as described in claim 8 wherein pressurized gas is suppliable through said vessel gas line to each said vessel to transfer liquid out of said vessel.

10. A liquid transfer system as described in claim 9, further including a first liquid flow control valve being disposed in said liquid supply line for the selectable dispensing of said liquid from said liquid supply tank to each said vessel.

11. A liquid transfer system as described in claim 10, further including a second liquid flow control valve being disposed to receive liquid from each said vessel and to output said liquid to a liquid output line.

12. A liquid transfer system as described in claim 11, further including a liquid return line for supplying liquid from said vessels to said tank, and including a third liquid flow control valve being disposed within said liquid output line for selectably supplying liquid from said vessels to said liquid return line.

13. A liquid transfer system as described in claim 12, further including a liquid filtration system being engaged in said liquid output line for filtering liquid passing therethrough.

14. A liquid transfer system as described in claim 11 wherein a programmable electronic control unit is utilized to control the opening of said first and second liquid control valves to operate said system.

15. A liquid transfer system as described in claim 9 wherein a gas pressure control valve is disposed in said vessel gas supply line to selectably control the gas pressure supplied to said vessels, and thereby control the liquid flow rate from said vessels.

16. A liquid transfer system as described in claim 15 wherein a programmable electronic control unit is utilized to control the opening of said gas pressure control valve.

17. A liquid transfer system as described in claim 1 wherein a deionized water supply line is engaged to said liquid supply line to provide deionized water into said liquid supply line for intermixing thereof with said liquid in said liquid supply line.

18. A liquid transfer system as described in claim 17 further including a liquid concentration detection means to provide liquid concentration data of liquid contained within said system for controlling the quantity of deionized water that is intermixed with liquid in said system.

19. A liquid transfer system as described in claim 1, further including a liquid sample port being engaged with said liquid output line for receiving liquid therefrom for the analysis thereof.

20. A liquid transfer system as described in claim 19, wherein a source of deionized water is provided to said liquid sample port to clean said sample port.

21. A liquid transfer system as described in claim 1, further including at least one other liquid holding tank being engaged with a second liquid supply line for supplying further liquid to said liquid holding vessels.

22. A liquid transfer system as described in claim 1 wherein said tank is disposed within a pressurizable cabinet.

23. A liquid transfer system comprising:
    a liquid supply tank;
    at least two pressurizable liquid holding vessels;
    a liquid supply line being connected between said tank and each said vessel for supplying liquid from said tank to each said vessel, said liquid supply line being engaged to said tank to act as a liquid siphon in withdrawing said liquid from said tank and supplying said liquid to said vessels;
    a vacuum means being operatively engaged to said liquid supply line to initiate said liquid siphon within said liquid supply line;
    a siphoned liquid sensor means being operatively engaged within said liquid supply system to provide an indication that siphoned liquid is passing from said liquid supply tank to said liquid holding vessels; and
    a programmable electronic control unit being engaged to said siphoned liquid sensor means and to said vacuum means and operating to turn off said vacuum means when said passing of siphoned liquid is indicated.

24. A liquid transfer system as described in claim 23 wherein a vacuum from at least one of said vessels is utilized to initiate said siphon.

25. A liquid transfer system as described in claim 24 wherein a vessel gas line is engaged to each said vessel to remove gas from said vessel as liquid is inlet into said vessel.

26. A liquid transfer system as described in claim 25 wherein pressurized gas is suppliable through said vessel gas line to each said vessel to transfer liquid out of said vessel.

27. A liquid transfer system as described in claim 23 further including a liquid filtration system being engaged in said liquid output line for filtering liquid passing therethrough.

28. A liquid transfer system comprising:
- a liquid supply means;
- at least two pressurizable liquid holding vessels;
- a liquid supply line being connected between said liquid supply means and each said vessel for supplying liquid from said liquid supply means to each said vessel, said liquid supply line being engaged to said liquid supply means to act as a liquid siphon in withdrawing said liquid from said tank and supplying said liquid to said vessels;
- a gas pressure means being operatively engaged to said liquid supply means to initiate said liquid siphon within said liquid supply line;
- a liquid output line being operatively engaged to said liquid holding vessels for the transfer of liquid therefrom.

29. A liquid transfer system as described in claim 28, further including:
- a siphoned liquid sensor means being operatively engaged within said liquid supply system to provide an indication that siphoned liquid is passing from said liquid supply tank to said liquid holding vessels; and
- a programmable electronic control unit being engaged to said siphoned liquid sensor means and to said gas pressure means and operating to turn off said gas pressure means when said passing of siphoned liquid is indicated.

30. A liquid transfer system as described in claim 28 wherein said liquid supply means comprises a liquid supply tank, and said liquid supply tank is pressurizable and said gas pressure means is operatively engaged to said liquid supply tank to provide pressurized gas to said liquid supply tank.

31. A liquid transfer system as described in claim 28 wherein said liquid supply means comprises a non-pressurizable liquid supply tank that is disposed within a pressurizable enclosure.

32. A liquid transfer system as described in claim 28 wherein said liquid supply means includes a liquid supply tank having an ambient pressure opening therethrough, and wherein said tank is disposed within a pressurizable enclosure;
- and wherein a gas pressure means is operatively engaged to said pressurizable enclosure to supply pressurized gas into said enclosure to initiate said siphon;
- and further including a siphoned liquid sensor means to detect the presence of siphoned liquid within said liquid supply line;
- a programmable electronic control unit being engaged to said siphoned liquid sensor means and to said gas pressure means and operating to turn off said gas pressure means when siphoned liquid is detected within said liquid supply line.

* * * * *